(12) United States Patent
Baert et al.

(10) Patent No.: US 12,179,468 B2
(45) Date of Patent: Dec. 31, 2024

(54) DECORATIVE PANEL AND METHOD FOR PRODUCING A PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 17/657,811

(22) Filed: Apr. 4, 2022

(65) Prior Publication Data

US 2023/0234328 A1 Jul. 27, 2023

(30) Foreign Application Priority Data

Jan. 7, 2022 (NL) ..................................... 2030461

(51) Int. Cl.
*E04B 2/00* (2006.01)
*B29C 44/02* (2006.01)
(Continued)

(52) U.S. Cl.
CPC .............. *B32B 5/18* (2013.01); *B29C 44/022* (2013.01); *B29C 44/3415* (2013.01); *B29C 44/505* (2016.11); *B32B 3/06* (2013.01); *E04F 13/0866* (2013.01); *E04F 13/0894* (2013.01); *E04F 15/02038* (2013.01); *E04F 15/107* (2013.01); *B29K 2101/12* (2013.01); *B29K 2509/02* (2013.01); *B29L 2031/104* (2013.01); *B32B 2264/107* (2013.01); *B32B 2307/72* (2013.01);
(Continued)

(58) Field of Classification Search
CPC B32B 5/18; B32B 3/06; B29C 44/022; B29C 44/505
See application file for complete search history.

(56) References Cited

U.S. PATENT DOCUMENTS

2003/0226328 A1* 12/2003 West ..................... E06B 3/7001
52/309.9
2010/0021715 A1 1/2010 Kondo
(Continued)

FOREIGN PATENT DOCUMENTS

BE 658063 8/1965
JP 2009078516 4/2016
(Continued)

OTHER PUBLICATIONS

European Patent Office Search Report in NL 2029345 dated Oct. 7, 2021.
(Continued)

*Primary Examiner* — Basil S Katcheves
(74) *Attorney, Agent, or Firm* — Heslin Rothenberg Farley & Mesiti PC (57) ABSTRACT

The invention relates to a floor or wall panel and to a method of producing such panel. The panel comprise at least one core layer comprising at least one composite material, said composite material comprising at least one mineral filler, and at least one thermoplastic binder, which are present in a preferred ratio and composition such that a relatively light weight and rigid panel is obtained.

11 Claims, 4 Drawing Sheets

(51) Int. Cl.
  *B29C 44/34* (2006.01)
  *B29C 44/50* (2006.01)
  *B32B 3/06* (2006.01)
  *B32B 5/18* (2006.01)
  *E04F 13/08* (2006.01)
  *E04F 15/02* (2006.01)
  *E04F 15/10* (2006.01)
  *B29K 101/12* (2006.01)
  *B29K 509/02* (2006.01)
  *B29L 31/10* (2006.01)

(52) U.S. Cl.
  CPC ..... *B32B 2419/04* (2013.01); *E04F 2201/023* (2013.01); *E04F 2201/043* (2013.01)

(56) References Cited

U.S. PATENT DOCUMENTS

| | | | |
|---|---|---|---|
| 2010/0247937 A1* | 9/2010 | Liu | C04B 28/14 |
| | | | 427/331 |
| 2014/0170359 A1 | 6/2014 | Schwitte et al. | |
| 2019/0263101 A1* | 8/2019 | Pervan | B32B 27/304 |
| 2020/0215799 A1* | 7/2020 | Hedlund | B32B 37/24 |
| 2020/0223197 A1* | 7/2020 | Hedlund | B32B 37/10 |
| 2020/0407149 A1* | 12/2020 | Pherson | B32B 37/18 |
| 2021/0164238 A1* | 6/2021 | Kuritz | B32B 27/365 |

FOREIGN PATENT DOCUMENTS

| | | |
|---|---|---|
| WO | 2006033706 A1 | 3/2006 |
| WO | 2010088769 A1 | 8/2010 |
| WO | 9917930 A1 | 7/2017 |
| WO | 2017121389 A1 | 7/2017 |
| WO | 2017133804 A1 | 8/2017 |
| WO | 2019228621 A1 | 12/2019 |
| WO | 2020007253 A1 | 1/2020 |
| WO | 2020009973 A1 | 1/2020 |
| WO | 2021094625 A1 | 5/2021 |
| WO | 2021180882 A1 | 9/2021 |

OTHER PUBLICATIONS

European Patent Office Search Report in NL 2029346 dated Oct. 7, 2021.
European Patent Office Search Report in NL 2028108 dated Apr. 30, 2021.
Thomas Luc Martine Baert et al.; Decorative Panel and Method for Producing a Panel; U.S. Appl. No. 17/454,398, filed Nov. 10, 2021.
Thomas Luc Martine Baert et al.; Flooring Panel; U.S. Appl. No. 17/380,581, filed Jul. 20, 2021.
Thomas Luc Martine Baert et al.; Flooring Panel; U.S. Appl. No. 17/804,425, filed May 27, 2022.
Thomas Luc Martine Baert et al.; Decorative Panel; U.S. Appl. No. 17/454,381, filed Nov. 10, 2021.

* cited by examiner

DECORATIVE PANEL AND METHOD FOR PRODUCING A PANEL

CROSS REFERENCE TO RELATED APPLICATIONS

This application claims priority under 35 U.S.C. § 119 to Netherland Patent Application No. NL 2030461 filed on Jan. 7, 2022, which is incorporated herein by reference in its entirety.

FIELD OF THE INVENTION

The invention relates to a floor or wall panel. The invention also relates to a method for producing such panel.

BACKGROUND

Thermoplastics such as PVC and PP are widely used polymers in the flooring industry. The popularity of these thermoplastics can be explained by their desirable properties, such as good moisture-, scratch- and stain resistance and the material benefits of being easy processable and available. In the past years, thermoplastic compositions common in the flooring industry have evolved from comprising a high thermoplastic content and low mineral filler content in a ratio of around 1:1 to compositions comprising a high mineral content of 60 wt % or higher. The benefits that this high mineral content imparts to the thermoplastic mineral composition are mainly thermostability and rigidity. The drawback is that the mineral fillers are relatively heavy compared to the thermoplastic binder, causing environmental concerns due to the weight of the finished product, impacting shipping and transportation. Hence, there is a desire to use thermoplastics in flooring in a more efficient way wherein there can be made use of their good properties whilst reducing the negative impact of the use the material. Further, there is always a desire to find relatively light weight materials which benefit of a good rigidity and are stable under temperature fluctuation.

Therefore, it is a goal of the invention to provide a panel that takes away at least one of the drawbacks of the prior art panels, or least to provide an alternative.

The invention provides thereto a floor or wall panel comprising:
  at least one core layer comprising at least one composite material, said composite material comprising:
    at least one mineral filler, and
    at least one thermoplastic binder,
wherein the ratio of mineral filler to thermoplastic binder is preferably at least 3:1; and
  at least one decorative top layer;
wherein the core layer is an extruded core layer and wherein at least part of the core layer is at least partially foamed.

The panel according to the present invention benefits of the combination of an extruded core layer comprising a relatively high mineral filler to thermoplastic binder ratio and the extruded core layer being at least partially foamed. The use of a high mineral filler content in a foamed extruded core layer provides the panel with extraordinary and useful characteristics. The panel according to the present invention benefits from the dimensional stability and indentation performance of a solid, rigid panel (i.e. SPC) having a solid thermoplastic core layer, for example of around 2100 kg/m3, but benefits also from the acoustic performance and low weight of a foamed composite (i.e. WPC), which has a foamed thermoplastic core layer, for example of around 900 to 1200 kg/m3. In addition to this, the panel according to the present invention can be said to have a reduction or at least a compromise on the disadvantages that both abovementioned SPC and WPC products exhibit.

A further benefit of the extruded core layer according to the present invention, is that said core layer allows direct lamination of the top layer onto the core layer. This is beneficial as this enables the use of a relatively simple lamination step for attaching at least one top layer to the core layer. At least one decorative top layer is preferably directly attached to an upper core surface of the at least one core layer. More in particular, at least one decorative top layer is preferably directly attached to an upper core surface of the at least one core layer without the interference of an adhesive layer. Hence, the lamination step may be done without the need of an adhesive layer. This is beneficial as a more reliable attachment can be created. Omitting the use of an adhesive further positively contributes to the reduction of VOC's. The panel according to the present invention preferably comprises at least one decorative top layer which is laminated to the at least one core layer. It is for example conceivable that at least one core layer and at least one decorative top layer are at least partially fused together. However, in an alternative embodiment, it is conceivable that an adhesive layer is present between the core layer and at least one top layer.

A difference between mineral plastic composite based panels according to some prior art which have a relatively high mineral content is that said panels use the mineral as binder material whereas the thermoplastic material is used as filler to reduce the weight of the panel. This results in practice in that when panels according to the prior art using a mineral binder will be foamed, said panels will have a very irregular density pattern between the middle and edges of board due to incompatible flow channel design. The panels will have a bubble gradient going from the side facing down to the side facing up during curing.

BRIEF DESCRIPTION OF THE DRAWINGS

The present invention applies to thermoplastic material as binder, whereas the mineral material is the filler. This enables that no typical curing process is needed during the fabrication. The panel according to the present invention is preferably subjected to a cooling and/or chilling process on both sides of the core layer resulting in that the bubble gradient is even at both sides of the panel, or in particular the core layer.

The invention will be further elucidated by means of non-limiting exemplary embodiments illustrated in the following figures, in which.

Within these figures, similar reference numbers correspond to similar or equivalent elements or features.

It was found that a panel according to the present invention can be made via method according to the present invention. The decorative panel according to the present invention is in particular a building panel. The panel can for example be a floor, wall and/or ceiling panel, in particular configured for forming a floor, wall and/or ceiling covering. The composite material could also be referred to as a thermoplastic composition. The at least one core layer is an extruded core layer, wherein the composite material is at least partially foamed. The at least partially foamed core layer typically comprises a closed cell foam structure.

At least one core layer typically has a density in the range of 1200 to 2100 kg/m3, preferably in the range of 1400 to 2000 kg/m3, preferably in the range of 1500 to 1900 kg/m3, more preferably in the range of 1600 to 1800 kg/m3, in particular for a PVC-limestone composition. The core layer preferably has a density which is below 2000 kg/m3, more preferably below 1800 kg/m3. In a preferred, non-limiting example, the density of the core layer is around 1700 kg/m3. The deviation of the average density of the core layer is preferably +/−50 kg/m3. The density of the core layer of the panel according to the invention is typically lower than the density of a conventional SPC panel but higher than the density of a conventional foamed WPC panel due to its increased mineral content. When compared to an SPC panel having a density of about 2100 kg/m3, it can be said that the panel according to the invention benefits of a lower plastic content, for example of about 20 wt % plastic, such as PVC and up to 20% weight reduction and an increased efficiency in shipping. Further it was experimentally found that such panel benefits of an improved acoustical performance: 23 dB Delta Lw for a panel according to the present invention having a core density of about 1700 kg/m3 compared to 18 dB Delta Lw for the conventional, non-foamed 2100 kg/m3 SPC panel. When comparing the same panel according to the invention, having a density of about 1700 kg/m3 with a conventional, foamed WPC panel having a density of 950 kg/m3, it was experimentally found that the panel according to the invention benefits of an improved dimension stability, in particular 0.01-0.05% for the panel according to the invention versus 0.2-0.3% for the WPC prior art panel, when tested according to ISO 23999. The panel according to the invention was further found to benefit of a reduced ratio of plastic, in particular PVC, an improved indentation resistance and the emittance of less VOC's due to the absence of adhesive. It is possible and within the scope of the current invention that other thermoplastics and/or mineral fillers are considered, which would entail different densities and weights for different foaming ratios for example as described in Tables I-III.

The panel according to the invention is preferably at least partly foamed. Different degrees of foaming are conceivable within the scope of the present invention. It is preferred that the panel, and in particular at least one core layer, has an expansion percentage in the range of 5% to 50%. Non-limiting examples are an expansion percentage in the range of 15% to 35%, in particular in the range of 20% to 30%. However, it is also conceivable that the panel, and in particular at least one core layer, has an expansion percentage of at least 10%, in particular at least 20%, more in particular at least 30% and even more in particular at least 40%. The expansion percentage is in particular a measure for the rate of change of the volume of the panel, and in particular the core layer.

The panel according to the present invention typically has a density gradient over its core layer. It is for example conceivable that at least one core layer of the panel has a density gradient. This could for example be a density gradient over the height of the core layer. It is for example imaginable that the density near the upper core surface and/or the density near the bottom core surface is higher than the density of a central region of the core layer which is situated between said upper core surface and bottom core surface. The density over at least part of the central region of the core layer is preferably substantially constant or homogeneous. It is for example conceivable that the density near the upper core surface and/or the density near the bottom core surface of the at least one core layer is at least 5% higher, and preferably at least 10% higher than the average density of the core layer. The density near the upper core surface and/or the density near the bottom core surface is preferably higher than the density of the bulk of the core layer. When the density near the upper core surface or near the bottom core surface is mentioned, an upper region or bottom region of the core layer could be meant. Basically, an embodiment is imaginable wherein the core layer comprises an upper skin layer and/or a bottom skin layer. Each skin layer can have a density which is at least 5% higher, and preferably at least 10% higher than the average density of the core layer. Such skin layer is an internal skin layer which forms integrally part of the core layer. The skin layer could also be referred to as crust layer. The skin layer basically forms an integral protective layer for the core layer. In a further preferred embodiment, the density (of the core layer) near the upper core surface is higher than the density (of the core layer) near the bottom core surface. It is for example also imaginable that at least one core layer has a density in the range of 70 to 90%, and preferably in the range of 75 to 85%, of the gravimetric density of the composite material (forming the core layer) in a non-foamed state.

It is preferred that at least one mineral filler of the composite material comprises calcium carbonate ($CaCO_3$), chalk, clay, calcium silicate (Si-Cal), dolomite, talc, magnesium oxide (MgO), magnesium chloride (MgCl or MOC cement), magnesium oxysulfate (MOS cement) and/or limestone. The use of at least one mineral material in the core layer is conceived to impart a sufficient rigidity thereby ensuring dimensional stability of the panel. It is for example conceivable that the mineral material comprises a magnesium-based mineral, such as but not limited to magnesium oxide (MgO), magnesium chloride (MgCl or MOC cement), magnesium oxysulfate (otherwise known as MOS cement). In case limestone is applied as mineral filler, it is beneficial if the mesh of limestone used is 325 mesh or 400 mesh.

The core layer preferably comprises a composite material having a weight ratio of mineral filler to thermoplastic binder which is at least 3:1. It is also conceivable that the composite material has a weight ratio of mineral filler to thermoplastic binder which is greater than 3.5:1 or in the range of 3:1 to 4:1. However, alternatively, it is also conceivable that the core layer comprises at least 30 wt % of at least one mineral filler, preferably at least 50% by weight, more preferably at least 60% by weight. The composite material could for example comprise at most 40% of said at least one thermoplastic binder, preferably at most 30% by weight, more preferably at most 25% by weight.

At least one thermoplastic binder of the composite material comprises for example polyvinyl chloride (PVC), polystyrene (PS), polyethylene (PE), polyurethane (PU), acrylonitrile butadiene styrene (ABS), polypropylene (PP), Polyethylene terephthalate (PET), phenolic and/or melamine or formaldehyde resins. The core layer preferably comprises at least one thermoplastic binder. However it is also conceivable that the core layer comprises additionally or alternatively at least one thermosetting binder. The use of at least one thermoplastic or thermosetting material in the core layer is conceived to impart flexibility characteristics to the panel when deemed necessary, for example when flexibility is required to achieve engagement of a locking mechanism.

The core layer, and/or the composite material, could further comprise at least one additive. It is for example conceivable that the core layer comprises at least one foaming agent and/or catalyst and/or at least one further filler. At least one (secondary) filler can for example be selected from the group consisting of: minerals, preferably calcium carbonate, and pigments, modifiers, fibers, such as: glass fiber, wood, straw and/or hemp. The fibers, if applied, can be loose fibers and/or interconnected fibers which form a woven or nonwoven layer. It is also conceivable that the core layer comprises at least one additional filler selected from the group consisting of steel, glass, polypropylene, wood, acrylic, alumina, curaua, carbon, cellulose, coconut, kevlar, Nylon, perlon, polyethylene, PVA, rock wool, viburnum and fique. The use of any of said components can further increase the strength of the panel itself and/or the water resistance and/or the fire resistance of the panel.

An embodiment of a panel is conceivable which comprises multiple core layers. In case multiple core layers are applied, preferably at least one core layer, and more preferably each core layer is an extruded core layer. It is further beneficial if at least one core layer and in particular each core layer is at least partially foamed. The panel could for example comprise at least two core layers. The core layers may be directly attached to another, for example without the interference of an adhesive layer. It is conceivable that that the core layers vary in thickness. It is also conceivable that the core layers have a different material composition. It is for example imaginable that an upper core layer has a lower density than a bottom core layer, or vice versa. Each core layer can be a core layer according to any of the embodiments described for the present invention. It is for example conceivable that each core layer comprises at least one skin layer according to the present invention. Hence, it is conceivable that two adjacent core layers are attached such that said adjacent skin layers are merged together forming an integral reinforcing layer within the core layer. In a preferred embodiment, at least one core layer is a co-extruded core layer. This can be for example 2 or 3-layer co-extrusion.

At least one core layer preferably has a thickness of at least 3 mm. It is for example conceivable that at least one core layer has a thickness between 3 mm and 12 mm or between 3 and 9 mm, preferably between 4 mm and 5.5 mm or between 5.5 mm and 7 mm. Beneficial embodiments comprise a core layer having a thickness in the range of 2.5 to 4 mm or in the range of 3.5 to 5 mm. In case multiple core layers are applied, it is also conceivable that said core layers vary in thickness. It is for example conceivable that the combination of core layers has a thickness between 3 and 12 mm. It is conceivable that multiple core layers are applied, wherein at least one core layer has a thickness in the range of 0.5 to 1 mm and at least one further core layer has a thickness in the range of 1 to 3 mm. It is possible that a core layer comprises at least three core layers, wherein a central core layer is enclosed between an upper core layer and a lower core layer. It is preferred that the upper core layer and/or the lower core layer have a larger thickness than the central core layer, or vice versa.

In a preferred embodiment, at least one core layer comprises at least one pair of opposite side edges which is provided with complementary coupling parts. In a further preferred embodiment, the panel, and in particular the core layer comprises at least one pair of opposite side edges which are provided with interconnecting coupling parts for interconnecting adjacent panels. The panel according to the present invention may comprise at least one pair of opposing (side) edges, said pair of opposing (side) edges comprising complementary coupling parts configured for mutual coupling of adjacent panels. The coupling parts of the panel may for example be interlocking coupling parts, which are preferably configured for providing both horizontal and vertical locking. Interlocking coupling parts are coupling parts that require elastic deformation, a click or a movement in multiple directions to couple or decouple the parts with or from each other. Any suitable interlocking coupling parts as known in the art could be applied. A non-limiting example is an embodiment wherein a first edge of said first pair of opposing edges comprises a first coupling part, and wherein a second edge of said first pair of opposing edges comprises a complementary second coupling part, said coupling parts allowing a plurality of panels to be mutually coupled; wherein the first coupling part comprises a sideward tongue extending in a direction substantially parallel to a plane defined by the panel, and wherein the second coupling part comprises a groove configured for accommodating at least a part of the sideward tongue of another panel, said groove being defined by an upper lip and a lower lip.

The at least one decorative top layer preferably comprises at least one décor layer and/or at least one protective layer. It is conceivable that at least one décor layer is attached to said the core layer, if applied. It is also conceivable that the décor layer is a print layer. It is also conceivable that at least one decorative layer is a print layer, in particular a digital print layer. The décor layer may also form integral part of the core layer. In a beneficial embodiment of the panel, at least part of the upper surface of the core layer is provided with at least one decorative pattern or decorative image. It is for example possible that such decorative image or pattern is provided via printing, for example via digital and/or inkjet printing. It is also possible that at least one decorative pattern is formed by relief provided in the upper surface of the core layer or panel. It is also conceivable that the décor layer or decorative layer is a separate layer, for example a high-pressure laminate (HPL), a veneer layer, a directly laminated paper layer, and/or a ceramic tile. In a preferred embodiment, at least one decorative layer comprises a thermoplastic film or a ply of cellulose. It is for example possible that the décor layer comprises a plurality of impregnated layers containing lignocellulose but also a wood veneer, a thermoplastic layer, a stone veneer, a veneer layer or the like and/or a combination of said materials. The veneer layer is preferably selected from the group comprising of wood veneer, cork veneer, bamboo veneer, and the like. Other materials such as ceramic tiles or porcelain, a real stone veneer, a rubber veneer, a decorative plastic or vinyl, linoleum, and laminated decorative thermoplastic material in the form of foil or film. The thermoplastic material can be PP, PET, PVC and the like. The design of the decorative layer can be chosen from a design database which includes digitally processed designs, traditional patterns, pictures or image files, customized digital artworks, randomized image pattern, abstract art, wood-patterned images, ceramic or concrete style images, or user-defined patterns. The designs can be printed or reproduced using laser printers, inkjet printers, or any other digital printing means including the conventional printing methods. Various types of inks can also be used to suit the design needs of the décor layer. Preferably, the ink used during the printing method comprises properties such as but is not limited to waterproofness, lightfastness, acid-free, metallic, glossy, sheen, shimmering, or deep black, among others. It is desirable that the decorative layer is visually exposed by the coating layer being a substantially transparent coating layer. The décor layer may comprise a pattern, wherein the pattern is printed via digital printing, inkjet printing, rotogravure printing machine, electronic line shaft (ELS) rotogravure printing machine, automatic plastic printing machine, offset printing, flexography, or rotary printing press. The thickness of the decorative layer is preferably in the range of 0.05 mm and 0.10 mm, for example substantially 0.07 mm.

In a preferred embodiment, the decorative top layer comprises at least one décor layer and/or at least one wear layer. The wear layer could for example be scratch resistant layer. The decorative top layer could possibly comprise a wear layer or finishing layer, for example with a thermosetting varnish or lacquer such as polyurethane, PUR, or a melamine based resin. In a preferred embodiment, the top layer comprises at least one substantially transparent wear layer or finishing layer. The wear layer may comprise one or more transparent layers of a thermoplastic or thermosetting resin. Non-limiting examples of thermoplastic or thermosetting materials which could be used are polyvinyl chloride (PVC), polystyrene (PS), polyethylene (PE), polyurethane (PU), acrylonitrile butadiene styrene (ABS), polypropylene (PP), Polyethylene terephthalate (PET), phenolic and/or melamine or formaldehyde resins. Said wear layer may also be in a liquid or paste-like form made of a thermosetting resin such as but not limited to phenolic and/or melamine or formaldehyde resins. The wear layer may comprise or may be substantially composed of an inherently scratch-resistant thermosetting resin impregnating a carrier layer such as paper or lignocellulose. An advantage of this latter embodiment is that the urea-formaldehyde also acts a relatively scratch-resistant wear layer. Typically, a preferred thickness of the wear layer structure in the panel of the invention is in the range of 0.1 to 2.0 mm, more preferably between 0.15 mm to 1 mm and most preferably between 0.2 mm to 0.8 mm.

In a preferred embodiment, the wear layer or finishing layer can comprise at least one coating layer. For example, the at least one coating layer may comprise a protective coating layer that is at least partially transparent or translucent. In a preferred embodiment, the at least one coating layer can for example be a polyurethane coating, an acrylic coating, and/or an epoxy polyol coating. Such coating can for example be an ultraviolet (UV) or electron beam (EB) curable coating. It is further conceivable that the coating layer comprises a thermoset resin and a photoinitiator cross-linked by a UV or electron beam curing process.

In a preferred embodiment the panel comprises at least one backing layer attached to a rear (or bottom) side of the core layer. The backing layer might be also called a cushioning layer or damping layer. The backing layer is typically made of a polymer material, for example but not limited to a low density foamed layer, of ethylene-vinyl acetate (EVA), irradiation-crosslinked polyethylene (IXPE), expanded polypropylene (XPP) and/or expanded polystyrene (XPS). However, it is also conceivable that the backing layer comprises nonwoven fibers such as natural fibers like hemp, cellulose fibers or cork, and/or recycled/recyclable material such as PET, felt, recycled carpet and the like. The cushioning or backing layer, if applied, attributes a sound dampening effect to the panel. A backing layer is further helpful in providing an optimum interface between the panel and the underlying surface on which the panels are applied and may provide a protective function for the core layer. It also allows to absorb some subfloor irregularities. The backing layer, if applied, preferably has a density in the range of 65 kg/m3 and 300 kg/m3, more preferably in the range of 80 kg/m3 and 150 kg/m3. The thickness of the backing layer typically varies from about 0.1 to 2.5 mm. Non-limiting examples of materials whereof the backing layer can be made of are polyethylene, cork, polyurethane and ethylene-vinyl acetate.

It is further conceivable that the at least one decorative top layer includes a tactile texture, preferably of at least 0.1 mm depth, most preferably at least 0.3 mm depth. Such tactile texture may provide an enhanced visual effect. The enhanced visual effect could also be referred to as embossing. In a possible embodiment of the invention, a texture or embossing can be provided during the production process by means of rotary or plate imprinting. It is possible that at least one wear layer, if applied, is embossed with a surface texture design. The texture design can be any design desired, such as the natural texture found in wood, stone and the like. The tactile structure, if applied, may for example have an irregular tactile texture. It is also conceivable that only part of the decorative top layer is provided with a tactile texture. In another possible embodiment, both the upper surface of the decorative top layer and the surface of a chamfer, which may be applied, can include a tactile texture, preferably of at least 0.1 mm dept. Especially when the top layer is produced via a lamination process, a single press machine can be used which makes it cost efficient to use a press plate with matching embossing for each decorative pattern in order to obtain a relief pattern on the top surface of the panel that matches the decorative pattern.

The invention also relates to a method of producing a floor or wall panel, in particular a panel according the present invention, comprising the steps of:
  providing at least one composite material, said composite material comprising:
    at least one mineral filler, and
    at least one thermoplastic binder,
  wherein the ratio of mineral filler to thermoplastic binder is preferably at least 3:1;
    providing at least one foaming agent;
    feeding a mixture of at least said composite material and said foaming agent to an extruder;
    subjecting the mixture to a heating and/or shearing step such that a melt under pressure is formed;
    subjecting the melt to a temperature which is at least the decomposition temperature of at least one foaming agent and preferably enabling a reduction of pressure in particular such that a melt having at least partially a foam structure is formed; and enabling the melt to at least partially expand prior to leaving the die of the extruder in particular such that an extruded core layer is formed which is at least partially foamed.

The invention alternatively also relates to a method of producing a floor or wall panel, in particular a panel according the present invention, comprising the steps of:

providing at least one composite material, said composite material comprising:
at least one mineral filler, and
at least one thermoplastic binder, wherein the ratio of mineral filler to thermoplastic binder is preferably at least 3:1;
providing at least one foaming agent;
feeding a mixture of at least said composite material and said foaming agent to an extruder;
subjecting the mixture to a heating and shearing step at a temperature which is at least equal to or above the decomposition temperature of at least one foaming agent such that a melt, in particular a melt having a foam structure, is formed; and
enabling the melt to at least partially expand prior to leaving the die of the extruder such that an extruded core layer is formed which is at least partially foamed.

The method according to the present invention enables the production of a floor or wall panel according to the present invention. The panel benefits of an extruded core layer comprising a relatively high mineral filler to thermoplastic binder ratio and the extruded core layer of the panel being at least partially foamed.

Alternatively, it can be said that the invention relates to a method for producing a floor or wall panel, in particular according to the present invention, the method comprising the steps of providing at least one composite material and at least one foaming agent, said composite material comprising at least one mineral filler, and at least one thermoplastic binder, wherein the ratio of mineral filler to thermoplastic binder is preferably at least 3:1, wherein the mixture of said composite material and said foaming agent is extruded such that an extruded core layer is formed wherein the core layer is at least partially foamed.

It is conceivable that step e) is performed such that substantially total decomposition of foaming agent occurs. The decomposition temperature typically depends on the type of foaming agent which is used. It is for example conceivable that step e) is performed at a temperature which is above 170 degrees Celsius. Said temperature can for example be in the range of 170 to 190 degrees Celsius. The temperatures applied in practice depend on the specific material compositions applied and the preferred extrusion conditions. The pressure loss in the die can be controlled by laterally varying axial lengths of a pressure loss control section. As the pressure is released at a controlled rate, the abovementioned temperatures typically only have a deviation of +/−5 degrees Celsius. It can be the case that bubbles will occur on the surface in case heating elements overheat the foaming agents in a conventional die. The melt can be subjected to multiple subsequent (axially) temperature zones from the screw to the die nip. A first temperature zone can be in the range of 170 to 190 degrees Celsius and/or a second temperature zone is in the range of 190 to 210 degrees Celsius and/or a third temperature cone can be in the range of 160 to 190 degrees Celsius. The surface temperature of at least one surface of the melt close to die nip can for example be in a range of 170 to 190 degrees Celsius, in particular 175 to 185 degrees Celsius, in particular to enable formation of a protective skin on at least one surface of the extruded core layer. The temperature difference between the screw and the die of the extruder and in particular the die nip of the extruder is for example at least 20 degrees Celsius, preferably at least 30 degrees Celsius.

Step f) is in particular a step wherein the melt is allowed to partially expand prior to leaving the extrusion die, passing through an extrusion die designed such that the melt residence time, temperature and/or pressure loss curve is substantially equal across the lateral width of the extrusion die such that the melt forms a core layer which is at least partially foamed. The average density variation across the lateral width of the core layer is thereby preferably controlled within 10%, more preferably within 5%.

Basically, the method according to the invention enables manipulation of the melt by means of temperature control and/or pressure control in the at least one die of the extruder. This enables that a foamed composition can be formed in a desired panel-shape. The way of temperature control can have overlapping properties of a temperature control system of WPC mold (typified by a PVC to limestone ratio of generally 1:1 to at most 2.2:1), whereas the pressure control can be achieved by having an overlapping design of flow channels and volumetric profile as applied in a SPC mold (typified by a PVC to limestone ratio of at least 2.5:1, generally around 3:1 to 3.5:1). The viscosity of the high mineral content prevents early bubble formation and loss of the foaming or blowing agents; while temperature and pressure control prevents bubble formation on surface of the extruded product. The extruder as applied in a method according to the present invention typically comprises a die having a substantially consistent or gradual reducing volumetric profile from the extrusion screw to the die nip, which is atypical for extrusion dies for foamed compositions. It is also conceivable that said volumetric profile is a slightly increasing. The extruder further for example comprises at least one hopper, screw, die and/or heater. The extruder is in particular configured for hot melt extrusion. The extrusion can for example also be co-extrusion.

The method may further comprise the step of cooling at least part of the upper core surface and/or at least part of the bottom core surface of the core layer before and/or after the core layer has left the die nip of the extruder, preferably substantially directly after the (formed) core layer has left the die nip of the extruder. This step can in particularly be applied such that a density gradient is created within the core layer. It is for example possible to apply a cooling step of at least part of the upper core surface and/or at least part of the bottom core surface of the core layer which causes that the density near the upper core surface and/or near the bottom core surface is higher than the average density of the core layer. Said cooling step can in particular cause the formation of a skin layer which forms integral part of the core layer.

It is conceivable that cooling at least part of the melt in the die of the extruder is performed such that the temperature of the melt is decreased with at least 10 degrees Celsius, preferably at least 20 degrees Celsius, more preferably at least 25 degrees Celsius. It is also conceivable that the melt in the die nip of the extruder is performed such that the temperature of the melt is decreased with at least 5 degrees Celsius, preferably at least 10 degrees Celsius. It is conceivable that the temperature of the melt at its top and bottom surfaces is reduced to substantially equal or less than the decomposition temperature of the blowing agent composition. It is conceivable that the temperature within the melt which is not directly exposed to the cooling step, substantially within the inner part of the core, is higher than the decomposition temperature of the blowing agent composition, allowing further expansion of the core. This can create a beneficial density gradient where at least one surface of the core has a higher density than the rest of the core.

It is beneficial if the extruder applied in the method according to the invention comprises a die having consecutive temperature zones, in particular wherein a first temperature zone is defined by a distribution channel at a height equal to the radius of the extruder inlet extending laterally across the width of the die to enable consistent pressure transfer from extrusion barrel to extrusion die, in particular featuring a distribution channel temperature, and at least one second temperature zone defined by a foaming section at a height which is at least constant or decreasing, in particular featuring a temperature which is at least equal to or higher than the decomposition temperature of the foaming agent and which temperature is preferably lower than the distribution channel temperature. The distribution channel temperature can for example be in the range of 170 to 190 degrees Celsius. The distribution channel temperature and the composition of the melt are of influence for, for example, the viscosity of the melt. It was experimentally found that a relatively viscous melt is beneficial for the overall characteristics of the panel, in particular for obtaining a desired expansion percentage.

The method may further comprises the step of controlling the pressure within the extruder. It is for example conceivable that pressure is controlled by adapting the volumetric profile of the internal channels of the extrusion die, in particular the height and/or volume of the internal channels.

The die of the extruder preferably comprises a laterally tapering distribution section which feature surrounding heating elements in particular configured to allow optimal distribution of the melt. The die may further comprise a pressure loss control system, which pressure loss control system is in particular configured designed such that the melt has a longer pressure loss control residence time in the lateral center of the die compared to the lateral edges of the die. It is desired that the residence time, temperature and/or pressure of the melt in the distribution section of the extrusion die and/or in the pressure loss control section (of the pressure loss control system) is substantially equal for all points on the boundary point between the pressure loss control section and a flow regulation section or foaming section. The pressure loss curve of the die is in particular characterized by an increase up to the pressure loss control section, followed by a gradual or constant decrease from the flow regulation section to the die nip.

The extruder may further comprise an even die nip landing configured for maintaining consistent pressure on the top and/or bottom surface, said die nip landing in particular being configured to allow the melt, in particular the highly viscous mineral composition, to flow freely. The die of the extruder may for example also comprises an oil- or water based temperature control system or an oil- or water based temperature control section which is configured to control the lateral temperature variance in at least at one zone of the die preferably within 5 degrees Celsius, preferably within at most 10 degrees Celsius. Such oil- or water based temperature control section, in particular cooling section, can be applied to bring at least the upper surface and/or bottom surface of the extruded core layer (or panel) to a temperature below or close to the decomposition temperature of the at least one foaming agent. It is preferred if the die does not feature a melt blocker at the mouth (of the die) to control the thickness such as is common for foamed compositions comprising high weight ratios of thermoplastics vs mineral filler, as this increased pressure close to the die nip is found to adversely affect the foaming process of the highly viscous melt and lead to an undesired loss of at least part of the foamed composition.

As indicated above, it is preferred that at least part of the upper surface and/or bottom surface of the core layer is cooled substantially directly before, during or after leaving the die nip. Said cooling step is preferably directly performed after the core layer leaves the die. An additional temperature control section, if applied, or at least one cooling module is therefore preferably positioned within 5 mm of the die nip. A cooling module can in particular be configured for cooling at least part of the upper surface and/or bottom surface of the core layer. The cooling step is typically configured to allow the at least partially foamed core layer to form a crust or skin (having an increased density) at least at the upper surface and/or bottom surface of the core layer.

The thickness of the core layer can for example be controlled by means of at least one pair of rollers. The method may include a step wherein the core layer is lead through a pair of rollers in particular in order to set the desired thickness of the panel. It is for example conceivable that a first and second nip roller set the desired thickness of the panel. Optionally, a further cooling step can be applied between the die nip and the first nip rollers. Optionally, the first nip rollers are cooled and serve as cooling module.

The method may also comprise the step of laminating at least one decorative top layer onto an upper core surface of the core layer. The lamination of at least one decorative top layer onto the core layer can for example be done by merging said layers. A conventional lamination module or lamination unit can be applied in order to perform the lamination step. A lamination step for attaching at least one decorative top layer to the core layer is both reliable and relatively simple. By applying such lamination step, the use of an adhesive layer can be omitted. It is for example conceivable that at least one core layer and at least one decorative top layer are at least partially fused together. It is conceivable that at least one further lamination module is positioned in line with the extrusion module to laminate at least one further protective and/or at least one balancing layer onto the panel. Hence, the method may further comprise the step of laminating at least one backing layer onto a bottom core surface of the core layer.

The extruder is for example a single screw extruder. The extruder could in a possible embodiment also be a twin screw extruder. The twin screw extruder can be co-rotating or counter rotating.

At least one foaming agent is applied in order to enable facilitate the formation of a foamed core layer. In a preferred embodiment, at least one foaming agent comprises azodicarbonamide ($C_2H_4N_4O_2$) and/or sodium bicarbonate ($NaHCO_3$). It was experimentally found that said chemical compounds are suitable to use as foaming agent for a composite material as applied in the present invention. The azodicarbonamide and sodium bicarbonate are preferably present in a ratio in the range of 1.5:1 to 3:1. Most preferably, the azodicarbonamide and sodium bicarbonate are present in a ratio of 2:1. The foaming agent can be added to the composite material at a total weight % of the composition of at most 1%, more preferably at most 0.8 wt %. In particular for sodium bicarbonate it is required that said compound is applied in an appropriate quantity as too much of it would cause the cells of the formed foam to collapse resulting in a denser foam structure. It was experimentally found that the foam density decreases almost linearly with an increase of sodium bicarbonate. In a preferred embodiment, the foaming agent is added in the range of 0.3 to 0.5 wt %. It was experimentally found 0.4 wt % of azodicarbonamide and sodium bicarbonate in a ratio of 2:1 causes 20% weight reduction for a composite material having a limestone to PVC ratio of 3:1.

Alternatively, or additionally, it is for example also possible that at least one foaming agent comprises N,N'-dinitroso-N,N'-dimethyl terephthalamide, N-aminophthalimide 4,4'-oxybis (benzenesulphonylhydrazide), N,N'-dinitrosopentamethylenetetramine, Azoisobutyric dinitrile, Diazoaminobenzene, Dinitropentamethylene tetramine, Benzenesulfohydrazide, Terephthalyl bis (N-nitrosomethylamide), Toluene-2,4-bis (sulfonyl hydrazide) p-tertiary butylbenzazide), p-carbomethoxy benzazide, Diarylpentaazadiene and/or 3 methyl, 1,5-diphenylpentaazadiene. At least one foaming agent can be an exothermic foaming agent and/or at least one foaming agent can be an endothermic foaming agent. The foaming agent can also be referred to as blowing agent.

It is beneficial if at least one foaming catalyst is added to the mixture prior to step d). The foaming catalyst, if applied, can for example be configured to decrease the decomposition temperature of the foaming agent. Hence, the foaming catalyst can also be configured to reduce the decomposition of at least one foaming agent to a desired temperature. The decomposition temperature can be lowered by the addition of at least one kicker or foaming catalyst. Non-limiting examples of foaming catalyst which can be applied for the present invention are CaO, Carbamide, Zinc 2-ethylhexanoate, Zinc benzenesulfinate, Zinc carbonate, Zinc ditolyl sulfinate, Zinc oxide, Zinc stearate, Ca/Zn esters, Ba/Zn esters, K/Zn esters, Dibutyltin bis(iso-octylmaleate) and/or Dialkyltin bis(alkylthioglycollates).

It is preferred that at least one mineral filler of the composite material comprises calcium carbonate (CaCO3), chalk, clay, calcium silicate, dolomite, talc, magnesium oxide (MgO), magnesium chloride (MgCl or MOC cement), magnesium oxysulfate (MOS cement) and/or limestone. The use of at least one mineral material in the core layer is conceived to impart a sufficient rigidity thereby ensuring dimensional stability of the panel. It is for example conceivable that the mineral material comprises a magnesium-based mineral, such as but not limited to magnesium oxide (MgO), magnesium chloride (MgCl or MOC cement), magnesium oxysulfate (otherwise known as MOS cement). In case limestone is applied as mineral filler, it is beneficial if the mesh of limestone used is 325 mesh or 400 mesh.

At least one thermoplastic binder of the composite material comprises for example polyvinyl chloride (PVC), polystyrene (PS), polyethylene (PE), polyurethane (PU), acrylonitrile butadiene styrene (ABS), polypropylene (PP), Polyethylene terephthalate (PET), phenolic and/or melamine or formaldehyde resins. The core layer preferably comprises at least one thermoplastic binder. However it is also conceivable that the core layer comprises additionally or alternatively at least one thermosetting binder. The use of at least one thermoplastic or thermosetting material in the core layer is conceived to impart flexibility characteristics to the panel when deemed necessary, for example when flexibility is required to achieve engagement of a locking mechanism.

The core layer, and/or the composite material, could further comprises at least one additive. Any of the additives described for the panel according to the present invention can be applied. The method may also comprises the step of profiling and/or edging at least one side edge of at least one panel, in particular the core layer. During this step, at least one side edge of the panel may be provided with complementary coupling parts. Optionally, the panel and/or the core layer can be subjected to at least one embossing step. Said embossing step, if applied, is in particular configured to apply a tactile texture to an upper surface of the panel.

It is conceivable that the upper core surface of the core layer is annealed, sanded and/or corona treated. Such treatment may further increase for example the surface energy of the core layer, which can be of positive influence for the bonding process. The method may further comprise the of annealing at a temperature of at least 90 degrees Celsius and a substantially constant pressure of at least 1 Mpa for at least 1 minute. Alternatively or additionally, the core layer could be annealed, for example at a temperature of at least 90 degrees Celsius for PVC or at least 140 degrees Celsius for PP.

The invention will be further elucidated by means of the following non-limiting exemplary examples of embodiments of extruded panels according to the invention, having a foamed compositions with mineral to thermoplastic content ratio of at least 3:1 as well as examples of panels having neighboring properties. The bold and underlined values represent compositions according to the present invention.

TABLE I

Chalk and PVC composition

| Component | | Resulting composition density (kg/m3) | | | | | |
|---|---|---|---|---|---|---|---|
| Chalk Density | PVC | | | | | | |
| 2500 kg/m3 | 1200 kg/m3 | By expansion percentage | | | | | |
| | | 0% | 10% | 20% | 30% | 40% | 50% |
| Ratio 4 | 1 | 2240 | 2016 | 1792 | 1568 | 1344 | 1120 |
| 3.5 | 1 | 2211 | 1990 | 1769 | 1548 | 1327 | 1106 |
| 3 | 1 | 2175 | 1958 | 1740 | 1523 | 1305 | 1088 |
| 2.5 | 1 | 2129 | 1916 | 1703 | 1490 | 1277 | 1064 |
| 2 | 1 | 2067 | 1860 | 1653 | 1447 | 1240 | 1033 |
| 1.5 | 1 | 1980 | 1782 | 1584 | 1386 | 1188 | 990 |
| 1 | 1 | 1850 | 1665 | 1480 | 1295 | 1110 | 925 |

| Component | | Resulting PVC content for 4 mm panel (kg/m2) | | | | | |
|---|---|---|---|---|---|---|---|
| Chalk Density | PVC | | | | | | |
| 2500 kg/m3 | 1200 kg/m3 | By expansion percentage | | | | | |
| | | 0% | 10% | 20% | 30% | 40% | 50% |
| Ratio 4 | 1 | 1.8 | 1.6 | 1.4 | 1.3 | 1.1 | 0.9 |
| 3.5 | 1 | 2.0 | 1.8 | 1.6 | 1.4 | 1.2 | 1.0 |
| 3 | 1 | 2.2 | 2.0 | 1.7 | 1.5 | 1.3 | 1.1 |
| 2.5 | 1 | 2.4 | 2.2 | 1.9 | 1.7 | 1.5 | 1.2 |
| 2 | 1 | 2.8 | 2.5 | 2.2 | 1.9 | 1.7 | 1.4 |
| 1.5 | 1 | 3.2 | 2.9 | 2.5 | 2.2 | 1.9 | 1.6 |
| 1 | 1 | 3.7 | 3.3 | 3.0 | 2.6 | 2.2 | 1.9 |

TABLE II

Talc and PP composition

| Component | | Resulting composition density (kg/m3) | | | | | |
|---|---|---|---|---|---|---|---|
| Talc Density | PP | | | | | | |
| 2800 kg/m3 | 920 kg/m3 | By expansion percentage | | | | | |
| | | 0% | 10% | 20% | 30% | 40% | 50% |
| Ratio 4 | 1 | 2424 | 2182 | 1939 | 1697 | 1454 | 1212 |
| 3.5 | 1 | 2382 | 2144 | 1906 | 1668 | 1429 | 1191 |
| 3 | 1 | 2330 | 2097 | 1864 | 1631 | 1398 | 1165 |
| 2.5 | 1 | 2263 | 2037 | 1810 | 1584 | 1358 | 1131 |
| 2 | 1 | 2173 | 1956 | 1739 | 1521 | 1304 | 1087 |
| 1.5 | 1 | 2048 | 1843 | 1638 | 1434 | 1229 | 1024 |
| 1 | 1 | 1860 | 1674 | 1488 | 1302 | 1116 | 930 |

Component

TABLE II-continued

Talc and PP composition

| | Talc Density | PP | Resulting PP content for 4 mm panel (kg/m2) | | | | | |
|---|---|---|---|---|---|---|---|---|
| | 2800 | 920 | By expansion percentage | | | | | |
| | kg/m3 | kg/m3 | 0% | 10% | 20% | 30% | 40% | 50% |
| Ratio | 4 | 1 | 1.9 | 1.7 | 1.6 | 1.4 | 1.2 | 1.0 |
| | 3.5 | 1 | 2.1 | 1.9 | 1.7 | 1.5 | 1.3 | 1.1 |
| | 3 | 1 | 2.3 | 2.1 | 1.9 | 1.6 | 1.4 | 1.2 |
| | 2.5 | 1 | 2.6 | 2.3 | 2.1 | 1.8 | 1.6 | 1.3 |
| | 2 | 1 | 2.9 | 2.6 | 2.3 | 2.0 | 1.7 | 1.4 |
| | 1.5 | 1 | 3.3 | 2.9 | 2.6 | 2.3 | 2.0 | 1.6 |
| | 1 | 1 | 3.7 | 3.3 | 3.0 | 2.6 | 2.2 | 1.9 |

TABLE III

Si-Cal and PVC composition

| Component | | | | | | | | |
|---|---|---|---|---|---|---|---|---|
| | Si-Cal Density | PVC | Resulting composition density (kg/m3) | | | | | |
| | 2900 | 1200 | By expansion percentage | | | | | |
| | kg/m3 | kg/m3 | 0% | 10% | 20% | 30% | 40% | 50% |
| Ratio | 4 | 1 | 2,560 | 2,304 | 2,048 | 1,792 | 1,536 | 1,280 |
| | 3.5 | 1 | 2,522 | 2,270 | 2,018 | 1,766 | 1,513 | 1,261 |
| | 3 | 1 | 2,475 | 2,228 | 1,980 | 1,733 | 1,485 | 1,238 |
| | 2.5 | 1 | 2,414 | 2,173 | 1,931 | 1,690 | 1,449 | 1,207 |
| | 2 | 1 | 2,333 | 2,100 | 1,867 | 1,633 | 1,400 | 1,167 |
| | 1.5 | 1 | 2,220 | 1,998 | 1,776 | 1,554 | 1,332 | 1,110 |
| | 1 | I | 2,050 | 1,845 | 1,640 | 1,435 | 1,230 | 1,025 |

| Component | | | | | | | | |
|---|---|---|---|---|---|---|---|---|
| | Si-Cal Density | PVC | Resulting PVC content for 4 mm panel (kg/m2) | | | | | |
| | 2900 | 1200 | By expansion percentage | | | | | |
| | kg/m3 | kg/m3 | 0% | 10% | 20% | 30% | 40% | 50% |
| Ratio | 4 | 1 | 2.0 | 1.8 | 1.6 | 1.4 | 1.2 | 1.0 |
| | 3.5 | 1 | 2.2 | 2.0 | 1.8 | 1.6 | 1.3 | 1.1 |
| | 3 | 1 | 2.5 | 2.2 | 2.0 | 1.7 | 1.5 | 1.2 |
| | 2.5 | 1 | 2.8 | 2.5 | 2.2 | 1.9 | 1.7 | 1.4 |
| | 2 | 1 | 3.1 | 2.8 | 2.5 | 2.2 | 1.9 | 1.6 |
| | 1.5 | 1 | 3.6 | 3.2 | 2.8 | 2.5 | 2.1 | 1.8 |
| | 1 | I | 4.1 | 3.7 | 3.3 | 2.9 | 2.5 | 2.1 |

The tables provide information over the resulting composition density and the polymer content when considering extruded panels of 4 mm comprising a composite material as indicated for a given range of expansion percentages. Within these examples, further additives, fillers and/or contaminants are not considered. The given density values are an average of the respective densities of the polymer and inorganic filler. It is conceivable that, in practice, the density of a core layer is further adjusted based upon the preferred properties. The numbers given in the tables are basically indicative for theoretical densities when only considering a single polymer, one pure inorganic filler at a predetermined expansion percentage merely to show the effect of these parameters. From the experiments it can be concluded that the polymer content can be reduced significantly when using a relatively high mineral content, even at relatively low expansion percentages.

Figure 1A:
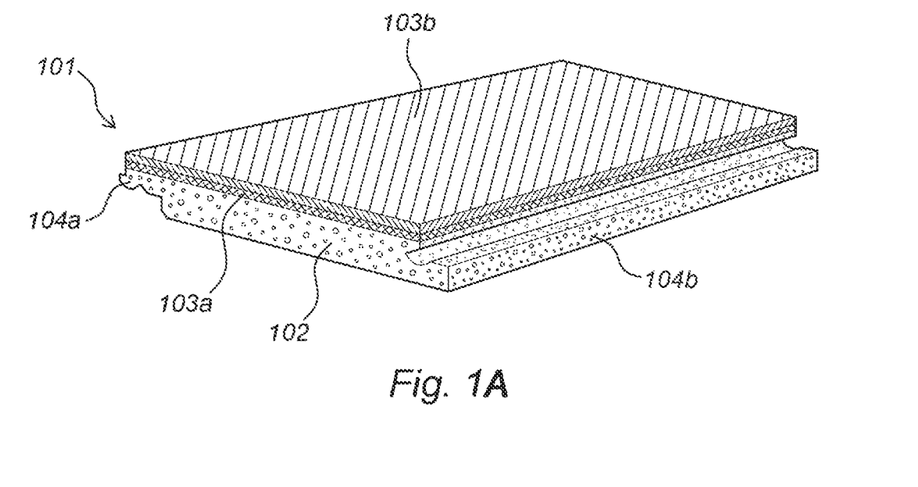
FIG. 1A shows a perspective view of a first embodiment of a panel according to the present invention.
Figure 1B:
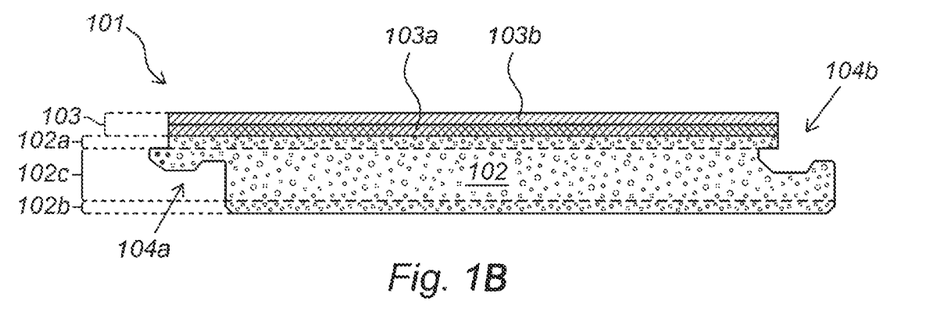
FIG. 1B shows a cross section of the panel as shown in FIG. 1A.

FIG. 1A shows a perspective view of a first embodiment of a panel 101, in particular a floor or wall panel 101, according to the present invention. FIG. 1B shows a cross section of the panel 101 as shown in FIG. 1A. The panel 101 comprises a core layer 102 and a decorative top layer 103. In the shown embodiment, the decorative top layer 103 comprises a décor layer 103a and a protective layer 103b. The core layer 102 comprises a composite material comprising at least one mineral filler and at least one thermoplastic binder. The core layer 102 is an extruded cure which is at least partially foamed. The core layer 102 comprises two pairs of opposite side edges. In the shown embodiment, a first pair of opposite side edges is provided with interconnecting coupling parts 104a, 104b for interconnecting adjacent panels 101. 2. The decorative top layer 103 is directly attached to an upper core surface of core layer 102 without the interference of an adhesive layer. In the shown embodiment, the core layer 102 has a density gradient. The density near the upper core surface and/or the bottom core surface of the at least one core layer is higher than the average density of the core layer 102. It can be said that the core layer 102 comprises an upper skin layer 102a and a bottom skin layer 102b. The skin layers 102a, 102b enclose the center part 102c of the core layer 102. Each skin layer 102a, 102b is an internal skin layer 102a, 102b which forms integrally part of the core layer 102.

Figure 2A:
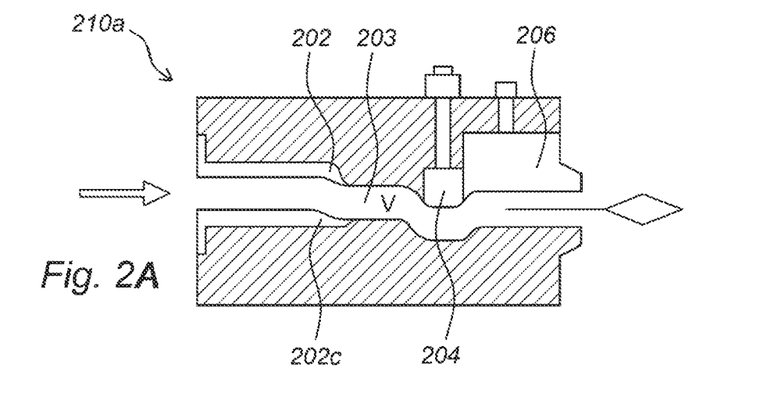
FIG. 2A shows a schematic axial or side view representation of a SPC extrusion die according to the prior art.
Figure 2B:
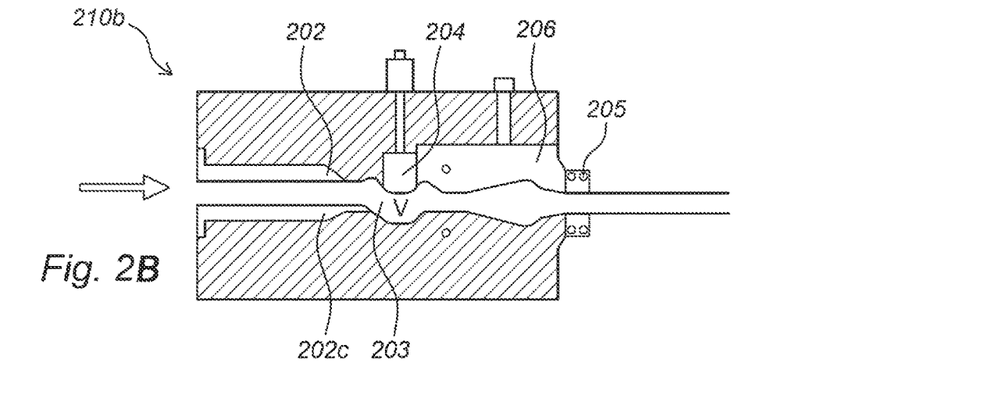
FIG. 2B shows a schematic axial or side view representation of WPC extrusion die of an according to the prior art.
Figure 2C:
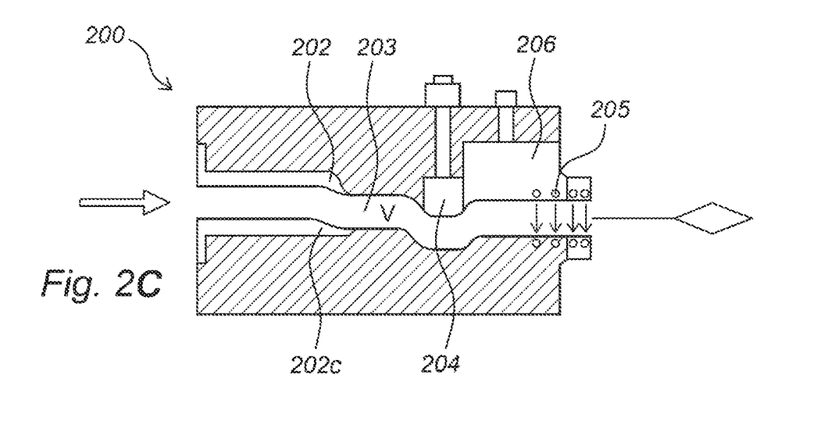
FIG. 2C shows a schematic axial or side view representation of an extrusion die which is applied for producing panels according to the present invention.
Figure 2D:
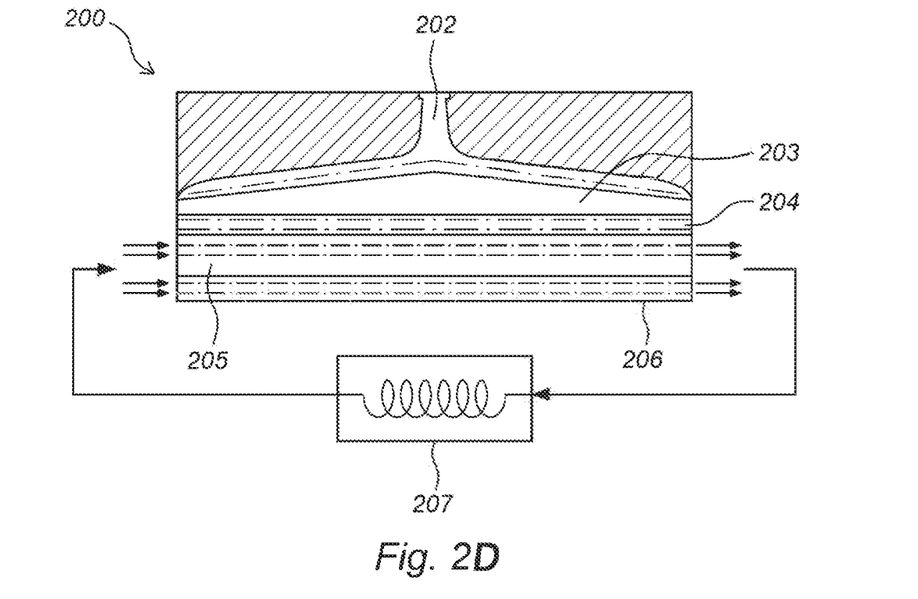
FIG. 2D shows a schematic lateral or top view representation of the extrusion die as shown in FIG. 2C.

FIGS. 2A, 2B, 2C, and 2D shows schematic representations of internal mold shapes of extruders which are applied in the prior art (FIGS. 2A, 2B) and of an extruder which is applied for producing panels according to the present invention (FIGS. 2C, 2D). FIG. 2A shows a mold or die 210a for producing a SPC panel, hence a solid, rigid panel having a relatively high mineral content and thereby also a relatively high density. The die 210b shown in FIG. 2B is configured for producing a WPC panel, in particular a foamed panel having a relatively low mineral content when compared to the SPC panel and also a relatively low density. The die 200 as shown in FIGS. 2C and 2D is configured for producing an extruded core layer having a relatively high mineral content whilst the core layer is at least partially foamed. FIG. 2C shows a side view whereas FIG. 2D shows a top view of the die as shown in FIG. 2C. It is remarkable to notice that the die 200 according to the present invention combines elements from the dies 210a, 210b which are used for respectively SPC and WPC panels. The flow direction of the melt is indicated with an arrow. The distribution sections 202 and corresponding distribution cavities 202c, the pressure loss control sections 203, flow regulation sections 204 and outlet control sections 206 are indicated in the figures. It can be seen that the die 200 according to the present invention comprises a superficial cooling section 205, which makes use of a temperature controller 207. The WPC die 210b comprises a cooling section 205 too, whereas the SPC die 210a does not have an internal cooling system in the die 210a. The invention enables manipulation of the melt by means of temperature control and pressure control in the die 200. The way of temperature control can have overlapping properties of a temperature control system of WPC die (FIG. 2B) whereas the pressure control can be done by having an overlapping design of flow channels and volumetric profile as applied in a SPC die (FIG. 2A) which is specifically designed for compositions with a high mineral content. The die 200 according to the present invention has a substantially consistent volumetric profile V or channel height from the extrusion screw to the die nip. When looking at the distribution channel of the extruder 200, the height of the distribution section 202 is larger than the pressure loss control section 203, the height of the pressure loss control section 203 is at least equal to (or larger than) the flow regulation section 204 and the height of the flow regulation section 204 is at least equal to (or larger than) the height of the outlet control section 206. This configuration ensures that the thickness of the panel is consistent. The pressure of the melt coming from the screw of the extruder 200 is increasing up until the pressure loss control system 204 (as it needs to be pushed through the pressure loss control system). The consistent height allows a consistent thickness as the pressure loss allows the melt to (slightly) expand with the reduced pressure.

Figure 2E:
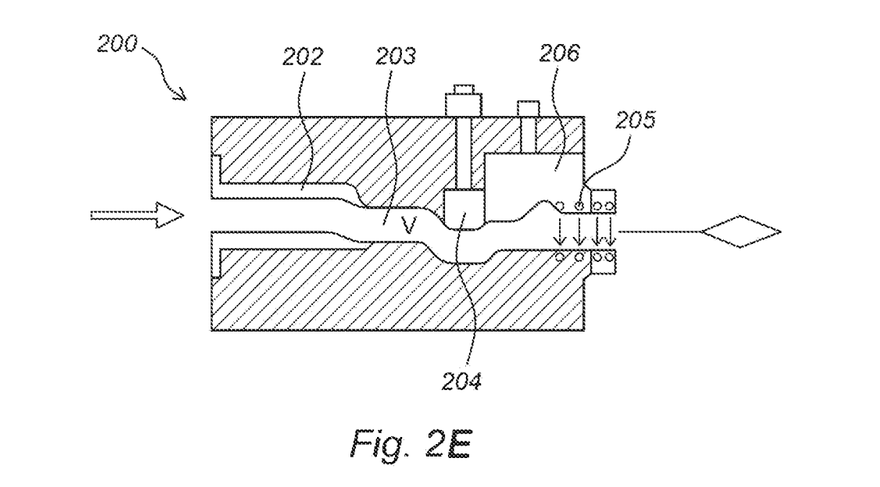
FIG. 2E shows a schematic axial or side view representation of an alternative embodiment of an extrusion die which is applied for producing panels according to the present invention.

FIG. 2E shows a schematic axial or side view representation of an alternative embodiment of an extrusion die 200 which is applied for producing panels according to the present invention. The die 200 is also configured for producing an extruded core layer having a relatively high mineral content whilst the core layer is at least partially foamed. The distribution section 202, the pressure loss control section 203 and flow regulation section 204 substantially correspond to the embodiment shown in FIG. 2C. It can also be seen that the shown embodiment combines elements from the dies 210a, 210b which are used for respectively SPC and WPC panels, where it must be noted that the outlet control section 206 comprises an expansion chamber which is configured to achieve relatively high expansion percentages and/or to allow a relatively fast release of pressure enabling the melt to foam. The flow direction of the melt is indicated with an arrow. The distribution sections 202 and corresponding distribution cavities 202c, the pressure loss control sections 203, flow regulation sections 204 and outlet control sections 206 are indicated in the figures. It can be seen that the die 200 according to the present invention comprises a superficial cooling section 205, which makes use of a temperature controller 207. The WPC die 210b comprises a cooling section 205 too, whereas the SPC die 210a does not have an internal cooling system in the die 210a. The invention enables manipulation of the melt by means of temperature control and pressure control in the die 200.

Figure 3:
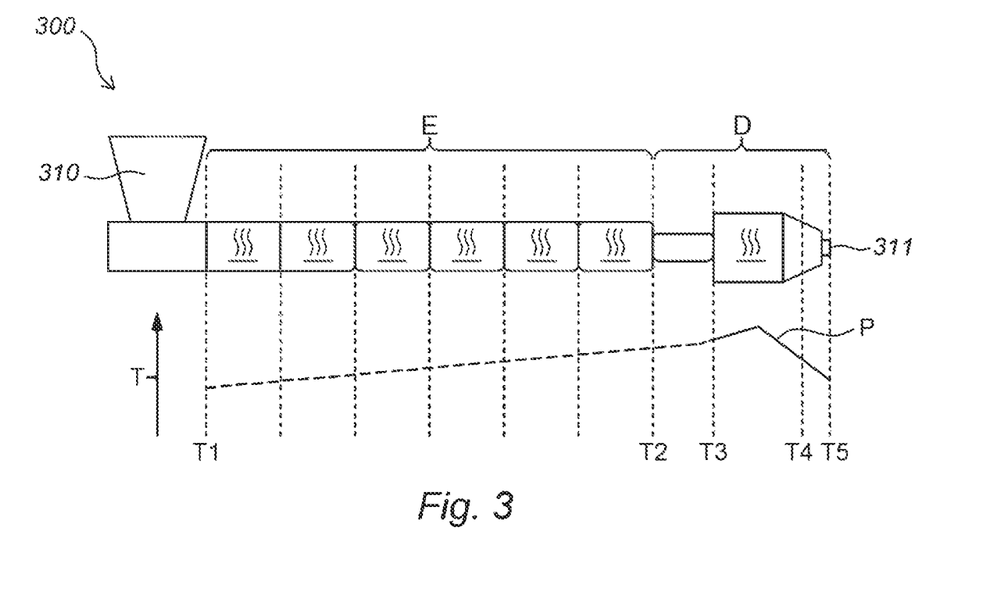
FIG. 3 shows a temperature profile of an extruder as applied within the context of the present invention.

FIG. 3 shows a schematic representation of an extruder 300 used in a method according to the present invention in particular for producing a panel according to the present invention. The composite material which is to be extruded is entered via the hopper 310 and leaves the extruder via the nip 311 of the die. The figure indicates different temperatures zones over the extrusion line as well as a temperature profile P of the melt. An extrusion section E and a die section D are indicated. The extrusion starts at a temperature T1, which temperature is increased to T2 during the heating and shearing step in the extrusion zone E. It is for example conceivable that the temperature difference between T1 and T2 is at least 15 degrees Celsius, preferably at least 20 degrees Celsius. The melt temperature is subsequently increased to T3, in order to enable the melt to at least partially expand. Cooling to respectively temperatures T4 and T5 is initiated in order to prevent that bubble formation at the surface occurs and/or in order to form a skin layer. T3 is typically in the range of 10 to 25 degrees higher than T2. Whereas T4 is in the range of 20 to 35 degrees lower than T3. T4 and T5 have a difference of about 10 degrees Celsius.

Figure 4:
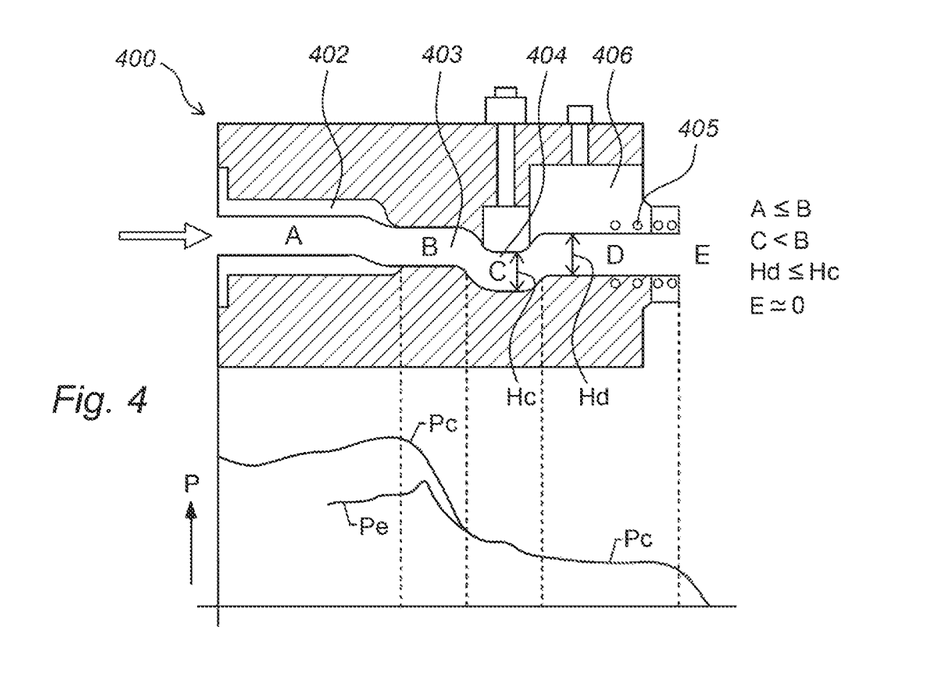
FIG. 4 shows an axial pressure profile of a melt traveling through an extrusion die as applied within the context of the present invention.

FIG. 4 shows a schematic representation of an axial pressure profile of a melt traveling through an extrusion die 400 as applied within the context of the present invention. The extrusion die 410 comprises a distribution section 402, pressure loss control section 403, flow regulation section 404, superficial cooling section 405 and an outlet control section 406. The channel height Hc, Hd of respectively the pressure loss control section 403 and the flow regulation section 404 is indicated as well. The pressure of the melt coming from the screw of the extruder is increasing up until the pressure loss control system 404. The graph indicates the pressure Pc for the center of the mold and the pressure Pe at the edges of the mold. The created pressure loss allows the melt to (slightly) expand with the reduced pressure. When comparing the embodiment shown with the embodiment of the die as shown in FIG. 2E, it can be remarked that it is possible for Hd to be topically larger than Hc, where typically at least the end parts should be smaller than Hc.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A floor or wall panel comprising:
   a substantially planar top side, a substantially planar bottom side, and at least four substantially linear side edges comprising at least one pair of opposite side edges;
   wherein the panel has a layered structure which comprises:
      at least one extruded and at least partially foamed core layer; and
      at least one decorative top layer;
      wherein the at least one extruded and at least partially foamed core layer comprises at least one composite material, said composite material comprising:
         at least one filler, wherein the at least one filler is a mineral filler; and
         at least one binder, wherein the at least one binder is a thermoplastic material;
      wherein the composite material comprises the at least one filler in an amount greater than or equal to 30 wt. % and the at least one binder in an amount less than or equal to 40 wt. %, and the ratio of mineral filler to thermoplastic material in the composite material is at least 3:1; and
   wherein the at least one extruded and at least partially foamed core layer has an average density variation, said average density variation across a lateral width of the at least one extruded and at least partially foamed core layer is within 10%.

2. The panel according to claim 1, wherein the at least one extruded and at least partially foamed core layer comprises an upper core surface; and wherein the at least one decorative top layer is directly attached to said upper core surface.

3. The panel according to claim 1, wherein the at least one extruded and partially foamed core layer has a density in the range of 1500 to 1900 kg/m$^3$.

4. The panel according to claim 1, wherein the at least one extruded and partially foamed core layer has a density gradient.

5. The panel according to claim 1, wherein the at least one extruded and partially foamed core layer has an average density, an upper core surface, and a bottom core surface;

and wherein the density near the upper core surface and/or the bottom core surface is at least 5% higher than the average density of the at least one extruded and partially foamed core layer.

6. The panel according to claim 1, wherein the at least one extruded and partially foamed core layer has a density in the range of 70 to 90% of the gravimetric density of the composite material in a non-foamed state.

7. The panel according to claim 1, wherein at least one mineral filler of the composite material comprises calcium carbonate, chalk, clay, calcium silicate, dolomite, talc, magnesium oxide, magnesium chloride, magnesium oxysulfate and/or limestone.

8. The panel according to claim 1, wherein at least one thermoplastic material of the composite material comprises polyvinyl chloride, polystyrene, polyethylene, polyurethane, acrylonitrile butadiene styrene, polypropylene, polyethylene terephthalate, phenolic and/or melamine or formaldehyde resins.

9. The panel according to claim 1, wherein the at least one extruded and at least partially foamed core layer has an expansion percentage of at least 10%.

10. The panel according to claim 1, comprising multiple extruded and partially foamed core layers.

11. The panel according to claim 1, wherein the at least one ore layer at least one pair of opposite side edges has complementary coupling parts.

\* \* \* \* \*